Patented Feb. 4, 1941

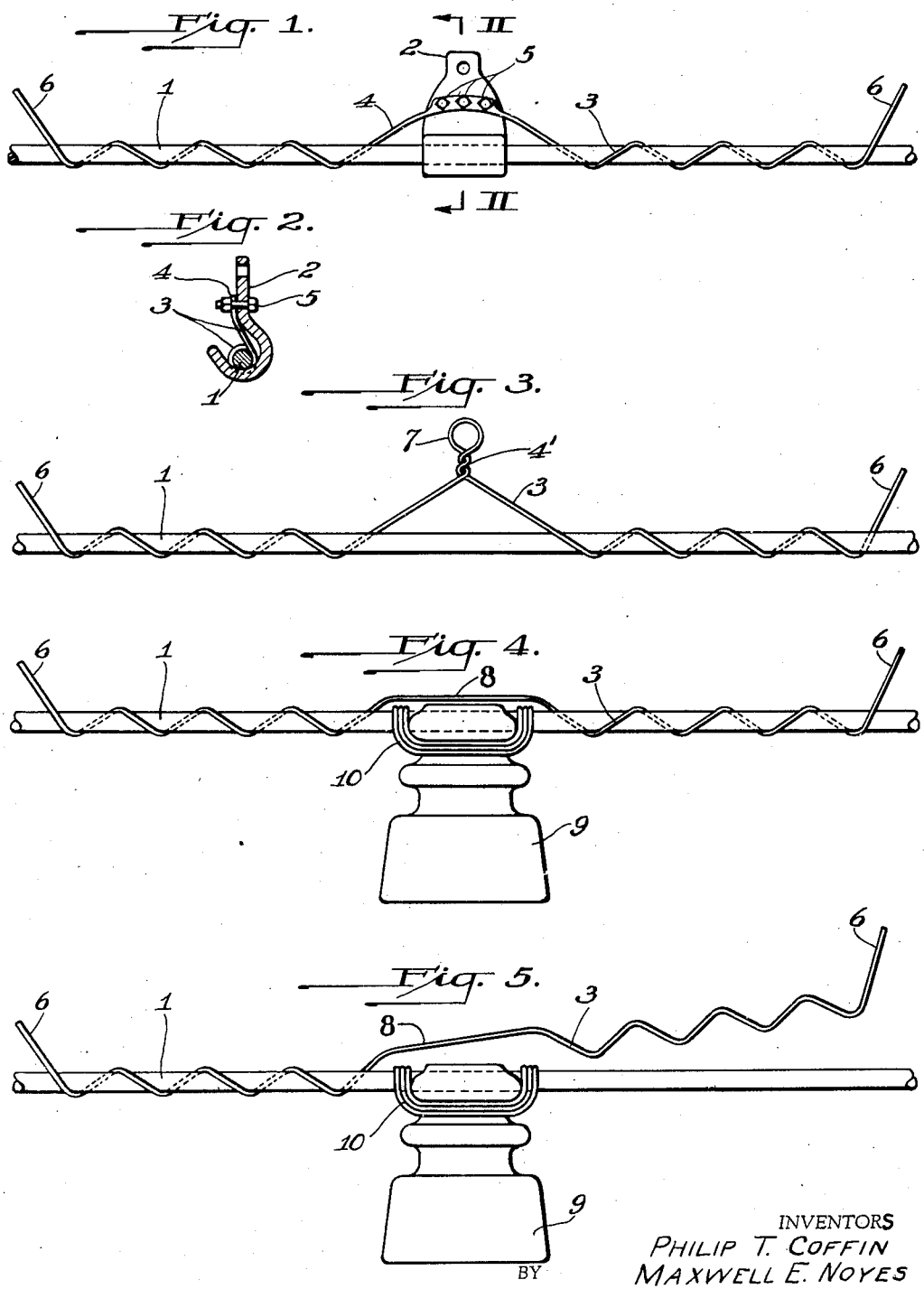

2,230,611

UNITED STATES PATENT OFFICE 2,230,611

CABLE PROTECTOR

Philip T. Coffin, Glen Ridge, N. J., and Maxwell E. Noyes, Pittsburgh, Pa., assignors to Aluminum Company of America, Pittsburgh, Pa., a corporation of Pennsylvania Application June 6, 1938, Serial No. 211,980

4 Claims. (Cl. 248—63)

This invention relates to protecting devices for electrical transmission lines, and more particularly to cable protectors consisting of a helically shaped wire or rod, in combination with a transmission line cable.

It is well known that suspended wires or cables, such as are commonly used in electrical transmission lines, are subject to breaking caused by bending stresses induced by vibration of the wires or cables. The vibration is caused by transverse air currents, and results in loops and nodes occurring along the conductor. The most frequent failures in transmission lines resulting from vibration occur at or near the points of support of the conductors. In an effort to overcome the deleterious effects of vibration, numerous devices have been proposed for checking or damping the vibration and for protecting the conductors at their points of support.

One type of cable protector which has met with some success consists of a rod or bar of metal which helically encircles the transmission line cable at and adjacent the point of support, and which is in intimate engagement with the cable throughout the length of the protector. Such a cable protector is pre-shaped by wrapping a malleable metal rod or bar about a mandrel which has a diameter slightly smaller than the diameter of the wire or cable to which it is to be applied, giving it a permanent set. It is then removed from the mandrel and applied to a transmission line by distending the helices of the device within their yield point, beginning at one end of the protector and proceeding toward the other end, so that they encircle the line and grip it tightly. The protector is then in tensional engagement with the line. Such a device serves to distribute the stresses resulting from the flexing of the line, reduces the amplitude of vibration, and lengthens the life of the conductor.

However, such devices are subject to certain difficulties and disadvantages, particularly when employed on transmission lines using certain types of supports or insulators. When the supports or insulators are designed to be in contact with any considerable portion of the conductor, as where the conductor is intended to lie in a groove in the support or insulator, the protector encircling the line rests on the groove of the support or insulator, and as a result there is an accumulation of bending stresses in the conductor at the points of contact with the support. The bending stresses are concentrated at those points. Furthermore, there is increased wear on the conductor at those points, caused by friction between it and the cable protector, and there is also wear on the portion of the protector which rests on the support or insulator.

A further difficulty encountered is that it is awkward to apply helical protectors of the type described above to transmission lines, because they are not provided with any convenient portion which can be gripped by a person applying them to the line. The helical shape of the protector renders it difficult to serve it around the line quickly and securely.

It is an object of our invention to provide a helical cable protector which will overcome the above-mentioned objections. It is a further object of this invention to provide a pre-formed helical cable protector which is in tensional engagement with the transmission line on either side of the support for the cable, but which is provided with an intermediate portion which is free from engagement with the cable. It is a further object of our invention to provide a preformed helical cable protector which will serve as a support for the transmission line cable to which it is applied. Other objects of our invention will be apparent from the following specification and claims, and from the accompanying drawing, in which:

Fig. 1 is a view in side elevation of a portion of a transmission line to which is applied one form of a pre-formed helical cable protector constructed in accordance with our invention;

Fig. 2 is a sectional view taken on the line II—II of Fig. 1;

Fig. 3 is a view in side elevation of a modification of the device shown in Fig. 1, in which the protector serves to support the cable;

Fig. 4 is a view in side elevation of another modification of our invention in operative position on a transmission line supported by an insulator; and Fig. 5 is a view in side elevation of the cable protector shown in Fig. 4, partly applied to the transmission line.

Referring to Figs. 1 and 2 of the drawing, the transmission line cable 1 is supported by hook 2 having a relatively wide bearing surface, which is attached by suitable means (not shown) to the pole which carries the line. A one-piece helical cable protector 3 in the form of a pre-formed rod tightly encircles the cable 1 on either side of the hook 2, the helical portions being in tensional engagement with the portion of the line which they encircle. The tensional engagement of the helical portions of the protector with the line results from the fact that the original bore of the protector, before it is applied to the cable 1, is slightly smaller than the diameter of the transmission cable. Intermediate its ends, the helical configuration of the protector is interrupted to provide an arch or loop 4 which may be fastened to the hook 2 by means of bolts 5 or other suitable fastening means. Each end of the protector is provided with extended portions 6 which project away from the cable and may be gripped readily by a person applying or removing the protector. Such a protector serves to reduce the amplitude of vibration of the cable and to distribute the bending stresses caused by the vibration.

Fig. 3 discloses a modification of my invention in which the protector 3 in the form of a pre-formed rod acts as a support for the transmission line cable 1, as well as serving to minimize the effect of vibration of the cable. In this modification, the helical configuration of the protector is interrupted intermediate the ends thereof to provide an intermediate portion which is twisted to provide a loop 7 which can be attached by suitable means (not shown) to the pole which carries the cable. It will be readily seen that a cable protector of this construction serves in place of the usual suspension clamp, in addition to reducing the effect of bending stresses in the cable.

The modification shown in Fig. 4 is designed to render helical cable protectors more effective when used on transmission cables supported by the pin type of insulators. In Fig. 4, the transmission line cable 1 is supported by an insulator 9 having a groove at the top thereof in which the cable rests, and in which the cable is held by a tie wire 10 attached to the cable and the insulator 9. An arch 8 is provided in the protector intermediate the helical portions thereof, and is so disposed as to extend over the insulator 9 and tie wire 10. When a helical protector is so constructed, the bending stresses in the conductor are not concentrated at the insulator, as is the case when the protector encircles the portion of the cable which lies in the groove of the insulator, as a result of the necessary contact between the protector and the insulator groove. Consequently, the effect of the bending stresses created by vibration of the cable is minimized, and the objectionable features previously mentioned as accompanying helical cable protectors are avoided.

To illustrate the manner in which pre-formed helical cable protectors are applied to transmission lines, Fig. 5 shows as partly applied to a line a protector of the type illustrated in Fig. 4, and described hereinabove.

It will be understood that various modifications can be made in the above-described improvements without departing from the spirit of the invention and from the following claims.

We claim:

1. In combination with a transmission line cable or the like, a cable protector comprising a rod pre-formed into spaced helical gripping portions of a smaller original bore than the diameter of the cable and applied along the cable on both sides of a means of support therefor, said rod being otherwise out of engagement with, and spaced from, said cable adjacent the means of support, and said gripping portions throughout their length being in self-maintained tensional engagement with the cable by reason of distention of said portions and constituting the sole means for holding the protector in engagement with the cable, all whereby concentrations of vibration-induced bending stresses in the cable adjoining the means of support are materially suppressed.

2. In combination with a transmission line cable or the like, a cable protector comprising a rod pre-formed into spaced helical gripping portions of a smaller original bore than the diameter of the cable and applied along the cable on both sides of a means of support therefor, said rod being otherwise out of engagement with, and spaced from, said cable adjacent the means of support, said supporting means comprising a section of said protector free from engagement with said cable and intermediate said helical portions, and said gripping portions throughout their length being self-maintained in tensional engagement with the cable by reason of distention of said portions, and constituting the sole means for holding the protector in engagement with the cable, all whereby concentrations of vibration-induced bending stresses in the cable adjoining the means of support are materially suppressed.

3. In combination with a transmission line cable or the like, a hook supporting said cable, and a cable protector comprising a rod pre-formed into spaced helical gripping portions of a smaller original bore than the diameter of the cable and applied along the cable on both sides of said hook, said rod being otherwise out of engagement with, and spaced from, said cable adjacent said hook, and said gripping portions throughout their length being in self-maintained tensional engagement with the cable by reason of distention of said portions, and said gripping portions and said hook constituting the sole means for holding the protector in engagement with the cable, all whereby concentrations of vibration-induced bending stresses in the cable adjoining the hook are materially suppressed.

4. In combination with a transmission line cable or the like, a cable protector comprising a rod pre-formed into spaced helical gripping portions of a smaller original bore than the diameter of the cable and applied along the cable on both sides of a means of support therefor, said rod being otherwise out of engagement with, and spaced from, said cable adjacent the means of support, said means of support comprising a loop in said rod, and said gripping portions throughout their length being in self-maintained tensional engagement with the cable by reason of distention of said portions, and constituting the sole means for holding the protector in engagement with the cable, all whereby concentrations of vibration-induced bending stresses in the cable adjoining the hook are materially suppressed.

PHILIP T. COFFIN.
MAXWELL E. NOYES.